(12) United States Patent
Tan

(10) Patent No.: US 12,379,796 B2
(45) Date of Patent: Aug. 5, 2025

(54) IMAGE SENSING SYSTEM CONTROL METHOD AND IMAGE SENSING SYSTEM

(71) Applicant: PixArt Imaging Inc., Hsin-Chu (TW)

(72) Inventor: Zi Hao Tan, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/659,038

(22) Filed: May 9, 2024

(65) Prior Publication Data
US 2025/0103154 A1     Mar. 27, 2025

Related U.S. Application Data

(63) Continuation-in-part of application No. 18/371,463, filed on Sep. 22, 2023.

(51) Int. Cl.
G06F 3/038     (2013.01)
G06F 3/03      (2006.01)
G06F 3/0354    (2013.01)

(52) U.S. Cl.
CPC .......... G06F 3/0383 (2013.01); G06F 3/0325 (2013.01); G06F 3/03543 (2013.01)

(58) Field of Classification Search
CPC ............... G06F 3/0383; G06F 3/03543; G06F 3/0304–0325; G06F 3/042–0428
See application file for complete search history.

(56) References Cited

U.S. PATENT DOCUMENTS

| 11,119,587 | B1 * | 9/2021 | Kong | .................. G06T 7/20 |
| 2021/0172755 | A1 * | 6/2021 | Song | .................. G01C 21/3626 |
| 2021/0271334 | A1 | 9/2021 | Lye | |

* cited by examiner

Primary Examiner — Lisa S Landis
(74) Attorney, Agent, or Firm — Winston Hsu

(57) ABSTRACT

An image sensing system control method, comprising: (a) defining a first reporting frame sensed at a first reporting frame time, and a second reporting frame sensed at a second reporting; (b) acquiring a first motion of the image sensing system for a first latency time interval between a first polling time and the first reporting frame time; (c) computing a second motion of the image sensing system for a first calibration time interval by the image sensor, wherein the first calibration time interval comprises a first frame time interval between the first, the second reporting frame times, and comprises a first expected latency time interval after the second reporting frame time; and (d) outputting a first output motion to the control circuit by the image sensor, thereby a difference between the first output motion and a physical movement of the image sensing system is smaller than a predetermined value.

18 Claims, 8 Drawing Sheets

IMAGE SENSING SYSTEM CONTROL METHOD AND IMAGE SENSING SYSTEM

CROSS REFERENCE TO RELATED APPLICATIONS

This application is a continuation-in-part of U.S. application Ser. No. 18/371,463, filed on Sep. 22, 2023. The content of the application is incorporated herein by reference.

BACKGROUND OF THE INVENTION

1. Field of the Invention

The present invention relates to an image sensing system control method and an image sensing system, and particularly relates to an image sensing system control method and an image sensing system which can reduce the non-synchronization between the frame rate and the polling command.

2. Description of the Prior Art

In an optical navigation device such as an optical mouse, the image sensor thereof captures frames at a predetermined frame rate and then computes the motion deltas between different frames. Such predetermined frame rate may change corresponding to different modes, for example, an active mode or a standby mode. Also, a MCU (micro control unit) polls the image sensor for motion delta (i.e. request the image sensor to output motion delta). However, the MCU polling rate and the image sensor frame rate are usually different and non-synchronized with each other. As a result, motion delta output and MCU polling are always non-consistent.

SUMMARY OF THE INVENTION

One objective of the present invention is to provide an image sensing system control method which can reduce effect caused by the non-synchronization between the polling commands and the frame rates.

Another objective of the present invention is to provide an image sensing system which can reduce effect caused by the non-synchronization between the polling commands and the frame rates.

One embodiment of the present invention discloses an image sensing system control method, applied to an image sensing system comprising an image sensor and a control circuit, comprising: (a) defining a first reporting frame sensed at a first reporting frame time by the image sensor, and defining a second reporting frame sensed at a second reporting frame time after the first reporting frame time; (b) acquiring a first motion of the image sensing system for a first latency time interval between a first polling time and the first reporting frame time, by the image sensor, wherein the image sensor receives a first poling from the control circuit at the first polling time; (c) computing a second motion of the image sensing system for a first calibration time interval by the image sensor, wherein the first calibration time interval comprises a first frame time interval between the first reporting frame time and the second reporting frame time, and comprises a first expected latency time interval after the second reporting frame time; (d) outputting a first output motion to the control circuit by the image sensor, thereby a difference between the first output motion and a physical movement of the image sensing system is smaller than a predetermined value.

Another embodiment of the present invention discloses an image sensing system, comprising: a control circuit; and an image sensor, configured to perform: (a) defining a first reporting frame sensed at a first reporting frame time, and defining a second reporting frame sensed at a second reporting frame time after the first reporting frame time; (b) acquiring a first motion of the image sensing system for a first latency time interval between a first polling time and the first reporting frame time, wherein the image sensor receives a first poling from the control circuit at the first polling time; (c) computing a second motion of the image sensing system for a first calibration time interval, wherein the first calibration time interval comprises a first frame time interval between the first reporting frame time and the second reporting frame time, and comprises a first expected latency time interval after the second reporting frame time; (d) outputting a first output motion to the control circuit by the image sensor, thereby a difference between the first output motion and a physical movement of the image sensing system is smaller than a predetermined value.

In view of above-mentioned embodiments, the image sensor may report the motions at the time synchronized with the polling commands, even if the frame rate changes frequently. Accordingly, the effect caused by non-synchronization between the frame rate and the polling commands can be reduced.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present invention. The components in each embodiment can be implemented by hardware (e.g. a circuit or a device), or by firmware (such as a processor installed with at least one program). Further, the components in each embodiment can be separated into more components or be integrated to fewer components. Additionally, the term "first", "second" . . . in following descriptions are only for distinguishing elements or steps, but do not mean to limit the sequence thereof.

Figure 1:
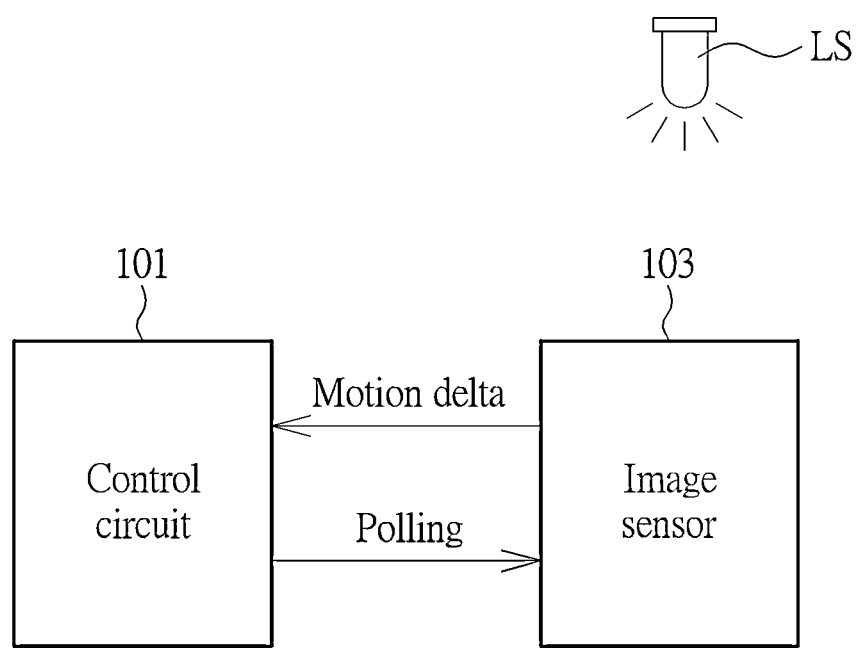
FIG. 1 is a block diagram illustrating an image sensing system according to one embodiment of the present invention.

FIG. 1 is a block diagram illustrating an image sensing system 100 according to one embodiment of the present invention. As illustrated in FIG. 1, the image sensing system 100 comprises a control circuit 101 and an image sensor 103. The control circuit 101 can be above-mentioned MCU or any other device which can perform the same function, such as a processor. The image sensor 103 is configured to sense a plurality of frames and to compute motion deltas between different frames. The control circuit 101 generates polling commands to the image sensor 103, and the image sensor 103 output motion deltas responding to the polling commands. The control circuit 101 and the image sensor 103 can be provided in the same device, but can be provided in different devices as well.

Figure 2:
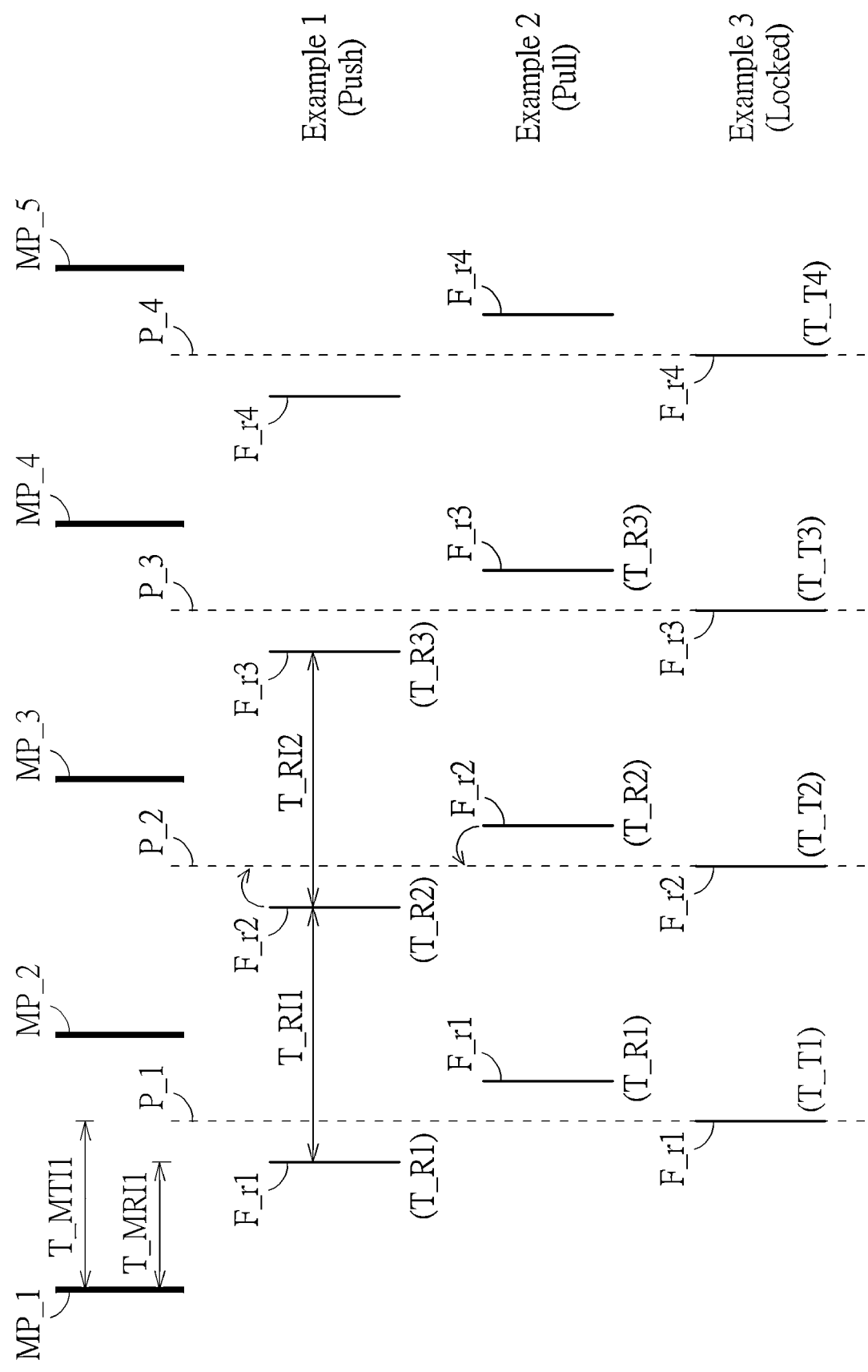
FIG. 2 is a schematic diagram illustrating the steps of adjusting at least one reporting time interval, according to one embodiment of the present invention.

FIG. 2 is a schematic diagram illustrating the steps of adjusting at least one reporting time interval, according to one embodiment of the present invention. The embodiment of FIG. 2 comprises three examples: Example 1, Example 2 and Example 3. In each of the examples, a first reporting frame F_r1 and a second reporting frame F_r2 are defined. The first reporting frame F_r1 is sensed at a first reporting frame time T_R1 and the second reporting frame F_r2 is sensed at a second reporting frame time T_R2 after the first reporting frame time T_R1. The image sensor 103 reports motions computed according to the first reporting frame F_r1 after the first reporting frame time T_R1, and reports motions computed according to the second reporting frame F_r2 after the second reporting frame time T_R2. In one embodiment, the image sensor 103 reports motions responding to a polling command which is after and closest to the frame which is used for motion calculation. For example, in FIG. 2, the image sensor 103 reports motions computed according to the first reporting frame F_r1 responding to the polling command MP_2 (second polling command), and reports motions computed according to the second reporting frame F_r2 responding to the polling command MP_3 (third polling command).

The first reporting frame F_r1 and the second reporting frame F_r2 can be defined by various methods. In one embodiment, sequence information of the first reporting frame F_r1 and the second reporting frame F_r2 are respectively identical with sequence information of frames which are already synchronized with polling commands from the control circuit 101. For example, sequences of frames in a predetermined time period are counted, thus it can be acquired that the 15$^{th}$ frame, the 30$^{th}$ frame, the 45$^{th}$ frame in the predetermined time period are synchronized with polling commands. By this way, in later sensing operations, the 15Kth frames (K is a positive interfere) are set as the motion reporting frames. However, the motion reporting frames can be defined by other methods rather than limited to these examples.

After the first reporting frame F_r1 and the second reporting frame F_r2 are defined, a first reporting time interval T_RI1 between the first reporting frame time T_R1 and the second reporting frame time T_R2 is adjusted, such that the second reporting frame time T_R2 is adjusted to meet a second target time T_T2. In other words, the sensing of the second reporting frame F_r1 is adjusted to meet the second target time T_T2. In one embodiment, an initial first reporting time interval T_RI1 is equal to a time interval between two adjacent polling commands. For example, the initial first reporting time interval T_RI1 is equal to a time interval between the polling command MP_1 (first polling command) and the polling command MP_2 (second polling command).

Also, in one embodiment, the first reporting time interval T_RI1 is adjusted after the first reporting frame F_r1 is sensed and before the second reporting frame F_r2 is sensed. In another embodiment, the first reporting time interval T_RI1 is adjusted before the first reporting frame F_r1 and the second reporting frame F_r2 are sensed. Please note, the first reporting frame time T_R1 and the second reporting frame time T_R2 can still be acquired by the image sensor 103, even if the first reporting frame F_r1 and the second reporting frame F_r2 are not sensed yet, since the first reporting frame time T_R1 and the second reporting frame time T_R2 may be defined by above-mentioned steps thus the first reporting frame time T_R1 and the second reporting frame time T_R2 are already acquired.

In one embodiment, a target reporting delay time interval between a target time and a polling command which is a closest polling command among the polling commands previous to the target time is computed. For example, a target reporting delay time interval T_MTI1 between the first target time T_T1 and a polling command MP_1 previous to the first target time T_T1 is computed. Also, a reporting delay time interval between a motion reporting frame and a polling command which is a closest polling command among the polling commands previous to the target time is computed. For example, a reporting delay time interval T_MRI1 between the first reporting frame F_r1 and a polling command MP_1 $s$ computed.

Afterwards, the first reporting time interval T_RI1 is adjusted according to a relation between the target reporting delay time interval T_MTI1 and the reporting delay time interval T_MRI1. In one embodiment, if the reporting delay time interval T_MRI1 is smaller than the target reporting delay time interval T_MTI1, the first reporting time interval T_RI1 is increased by a shift value. By this way, the second reporting frame F_r2 is pushed to the first target time T_T1, as shown in the Example 1 of FIG. 2.

On the contrary, if the reporting delay time interval T_MRI1 is larger than the target reporting delay time interval T_MTI1, the first reporting time interval T_RI1 is decreased by the shift value. By this way, the second reporting frame F_r2 is pulled to the first target time T_T1, as shown in the Example 2 of FIG. 2. Besides, in the Example 3, the reporting delay time interval T_MRI1 is equal to the target reporting delay time interval T_MTI1, which means the second reporting frame F_r2 is already synchronized with the second target time T_T2, thus the first reporting time interval T_RI1 is not adjusted.

In one embodiment, the shift value may be a constant value. In another embodiment, the shift value is a percentage of the first reporting time interval T_RI1, for example, 3% or 5% of the first reporting time interval T_RI1. In such case, the first reporting time interval T_RI1 can be gradually and consistently adjusted until the second reporting frame time T_R2 meets the second target time T_T2. In another embodiment, the second reporting frame time T_R2 can be instantly adjusted to meet the second target time T_T2. In such case, the shift value is equal to a difference between the target reporting delay time interval T_MTI1 and the reporting delay time interval T_MRI1.

In one embodiment, a time difference between the first target time T_T1 and one of the polling commands (e.g., the polling command MP_2) which is closest to the first target time T_T1 is a necessary time for generating the motions computed according to the first reporting frame F_r1. Also, a time difference between the second target time T_T2 and one of the polling commands (e.g., the polling command MP_3) which is closest to the second target time T_T2 is a necessary time for generating the motions computed according to the second reporting frame F_r2. Such necessary time may be the time for buffering frames for motion computation and/or the time needed for computing motions. However, if the speed of the image sensor 103 is fast enough, such necessary time can be regarded as 0. In such case, the first target time T_T1 can be the same as the time of receiving the polling command MP_1 and the second target time T_T1 can be the same as the time of receiving the polling command MP_2.

The above-mentioned steps in FIG. 2 can be performed to reporting frames following the second reporting frame F_r2. Please refer to FIG. 2 again. In FIG. 2, a third reporting frame F_r3 is defined. The third reporting frame F_r3 is sensed at a third reporting frame time T_R3 after the second reporting frame time T_R2. The image sensor 103 reports motions, which are computed according to the third reporting frame F_r3, after the third reporting frame time T_R3. For example, the image sensor 103 reports motions computed according to the third reporting frame F_r3, responding to the polling command MP_3.

Afterwards, the second reporting time interval T_R12 between the second reporting frame time T_R2 and the third reporting frame time T_R3 is adjusted, to adjust the third reporting frame time T_R3 to meet a third target time P 3. In one embodiment, the steps of adjusting the first reporting time interval T_R1 and the second reporting time interval T_R2 are simultaneously performed. Also, in one embodiment, the first reporting time interval T_R1 and the second reporting time interval T_R2 have the same values.

Other details of adjusting the second reporting time interval T_R12 are illustrated in above-mentioned embodiments, thus are omitted for brevity here. The steps of adjusting reporting time intervals can be periodically performed, for example, the reporting time intervals are adjusted every 100 frames. Alternatively, the steps of adjusting reporting time intervals can be triggered by a command. Additionally, the steps of adjusting reporting time intervals can be triggered by a mode switching of an image sensing system comprising the control circuit 101 and the image sensor 103 in FIG. 1. For example, the steps of adjusting reporting time intervals can be triggered when an optical mouse switches from a standby mode to an active mode.

Figure 3:
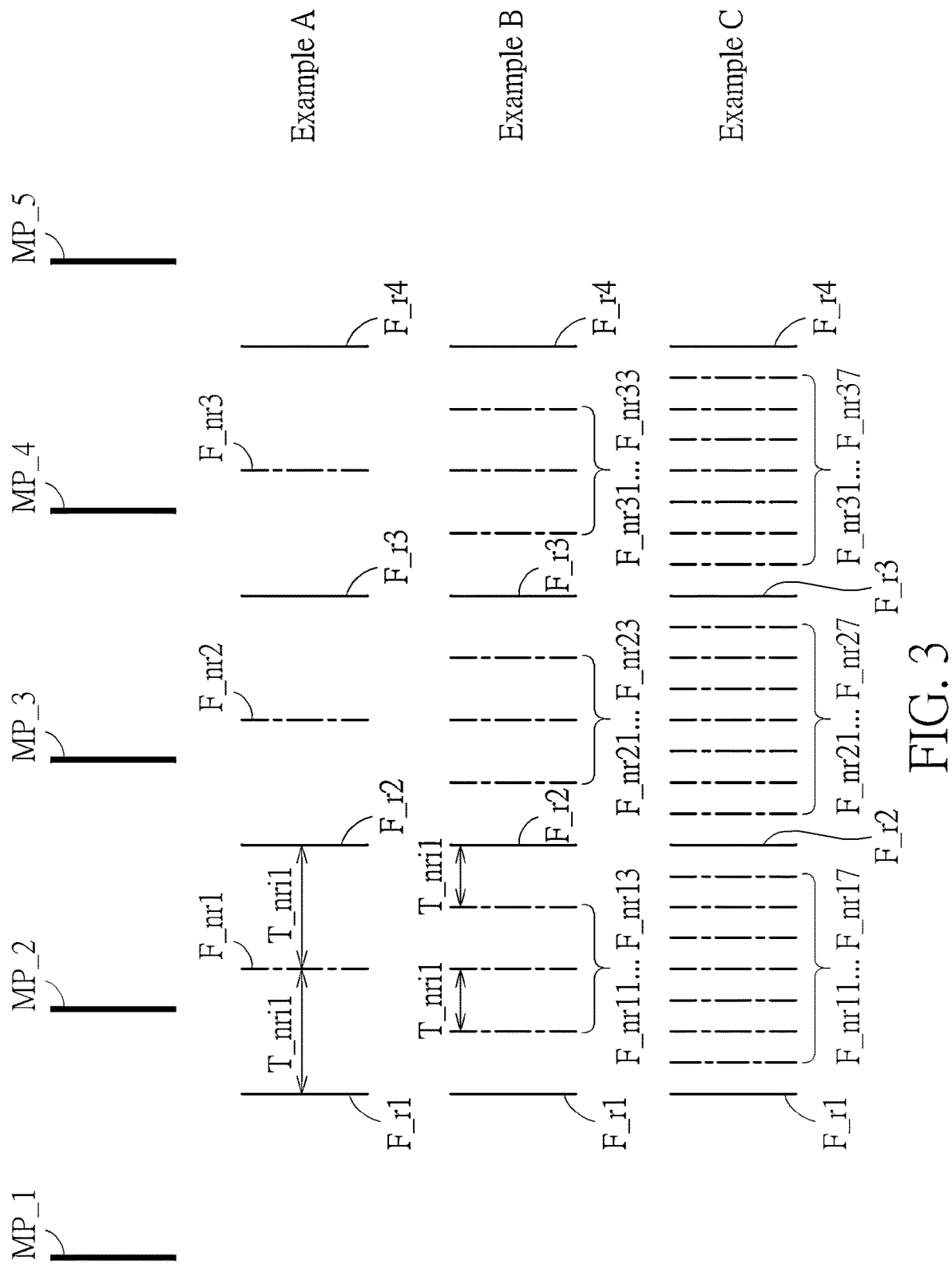
FIG. 3, and FIG. 4 are schematic diagrams illustrating the steps of setting non-reporting time intervals, according to embodiments of the present invention.
Figure 4:
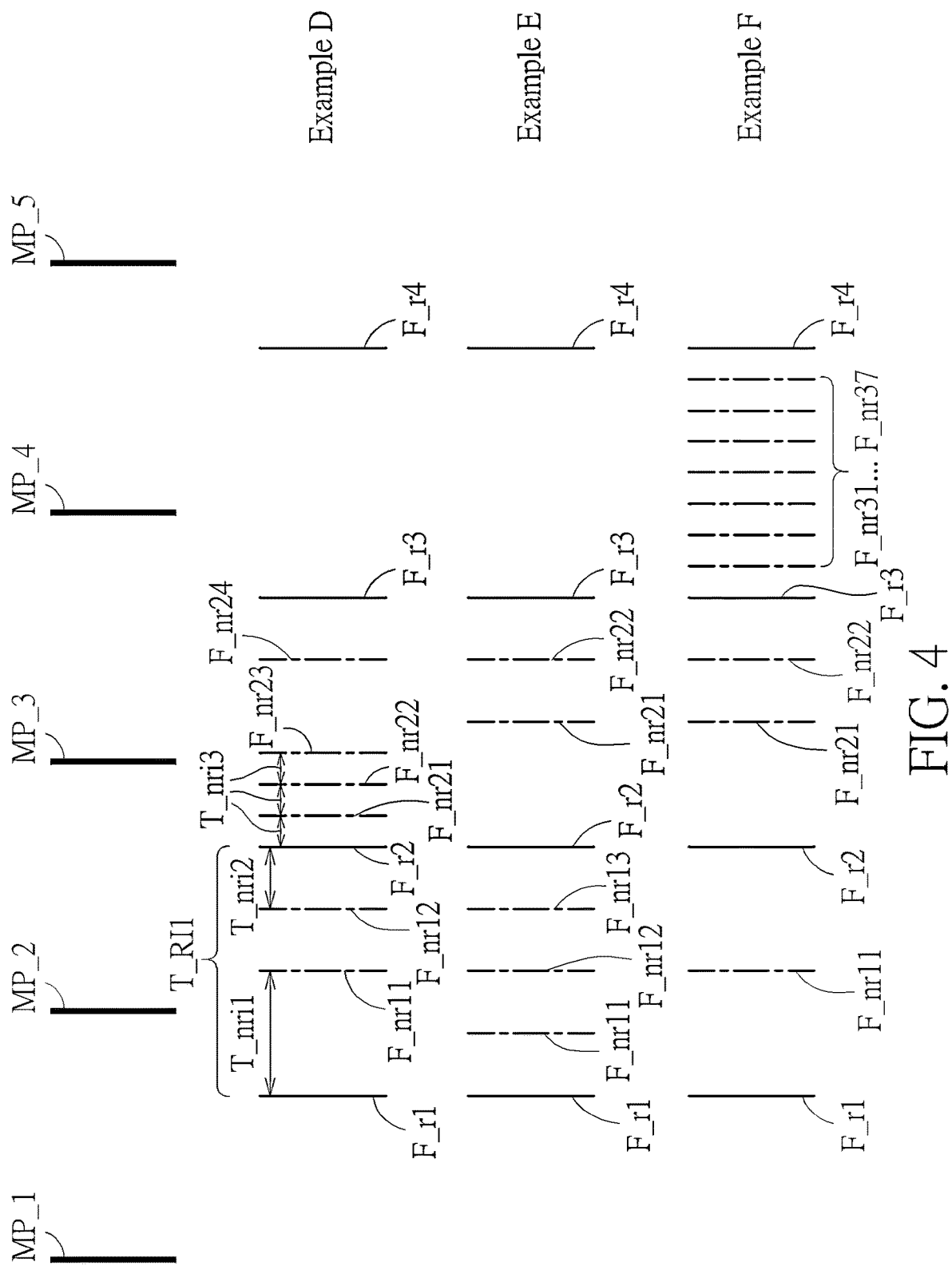

In one embodiment, at least one non-reporting frame is sensed between the reporting frames. FIG. 3 and FIG. 4 are schematic diagrams illustrating the steps of setting non-reporting time interval, according to embodiments of the present invention. Please note, for the convenience of understanding, the lines of target time in FIG. 1 and FIG. 2 are not illustrated in the embodiments of FIG. 3 and FIG. 4. FIG. 3 comprises three examples: Example A, Example B and Example C. In the embodiment of FIG. 3, first non-reporting time intervals of at least one first non-reporting frame F_nr11 . . . F_nr37 are computed, and the first non-reporting frame F_nr11 . . . F_nr37 are sensed based on the first non-reporting time intervals in following sensing operations. The first non-reporting time interval may be a time interval between the first reporting frame time and the first non-reporting frame which is closest to the first reporting frame. For example, the first non-reporting time interval may be a time interval T_nri1 between the first reporting frame time F_r1 and the first non-reporting frame F_nr1.

Also, the first non-reporting time interval may be a time interval between two adjacent first non-reporting frames. For example, the first non-reporting time interval T_nri1 may be a time interval between the first non-reporting frames F_nr11 and F_nr12 in Example B. Besides, the first non-reporting time interval may be a time interval between the second reporting frame and the first non-reporting frame which is closest to the second reporting frame. For example, the first non-reporting time interval T_nri1 is a time interval between the second reporting frame F_r2 and the first non-reporting frame F_nr1 in Example A, or a time interval between the second reporting frame F_r2 and the first non-reporting frame F_nr13 in Example B.

In one embodiment, values of the first non-reporting time intervals are equal to $$\frac{1}{X}$$

of the first reporting time interval T_RI1, wherein the X is a positive integer (1, 2, 3 . . . ). The first reporting time interval T_RI1 mentioned here may be the reporting time interval which has been adjusted via above-mentioned embodiments. Further, in one embodiment, X is $2^N$, N is a natural number (0, 1, 2, 3 . . . ). In Examples A, B, C of FIG. 3, N is respectively 1, 2, 3. When N=0, no non-reporting frame is sensed.

The first non-reporting time interval may be set corresponding to different requirements. In one embodiment, the image sensor 103 dynamically and automatically sets the first non-reporting time interval corresponding to different modes of an optical mouse which comprises the control circuit 101 and the image sensor 103. For example, if the optical mouse is in a standby mode or has a low speed, the first non-reporting time interval may be set to be lower, such that the image sensor 103 senses less frames in a predetermined time interval and consumes less power. On the contrary, if the optical mouse has a higher speed, the first non-reporting time interval may be set to be higher, such that the image sensor 103 senses more frames in a predetermined time interval and the motion computation can be more accurate.

In the embodiment of FIG. 3, the non-reporting time intervals are the same in a single reporting time interval and fixed in a whole sensing operation (e.g., in one example such as Example 1). However, it is not limited that the non-reporting time intervals are the same in a single reporting time interval or in a whole sensing operation. FIG. 4 comprises three examples: Example D, Example E, and Example F. In the Example D, non-reporting time intervals with different values exist in a single reporting time interval. For example, besides the first non-reporting time interval T_nri1 in the Example D, a second non-reporting time interval T_nri2 of a second non-reporting frame F_nr12 in Example D is further computed. The second non-reporting time interval T_nri2 is different from the first non-reporting time interval T_nri1.

As above-mentioned, the non-reporting time intervals can be $$\frac{1}{2^N}$$

of the first reporting time interval. Accordingly, in Example D of FIG. 4, N is 1 for the first non-reporting time interval T_nri1, and N is 2 for the second non-reporting time interval T_nri2. Similarly, the third non-reporting time intervals T_nri3 (N=3) for the third non-reporting frames F_nr21, F_nr22 and F_nr23 in Example D can be set following the above-mentioned steps. The definition of the second non-reporting time interval T_nri2 and the third non-reporting time interval T_nri3 are the same as which of the first non-reporting time interval T_nri1, thus descriptions thereof are omitted for brevity here. Following the same rule, N is 2 for the non-reporting time intervals of the non-reporting frames F_nr11, F_nr12 and F_nr13 in the Example E, and N are respectively 1 and 2 for the non-reporting time intervals of the non-reporting frames F_nr21, and F_nr22 in the Example E. Similarly, N is 1 for the non-reporting time interval of the non-reporting frame F_nr11 in the Example F, N is 2 for the non-reporting time interval of the non-reporting frame F_nr21, F_nr22 in the Example F, and N is 3 for the non-reporting time interval of the non-reporting frame F_nr31 . . . F_nr37 in the Example F. Accordingly, the non-reporting time intervals may be different in a single reporting time interval or in a whole sensing operation.

Figure 5:
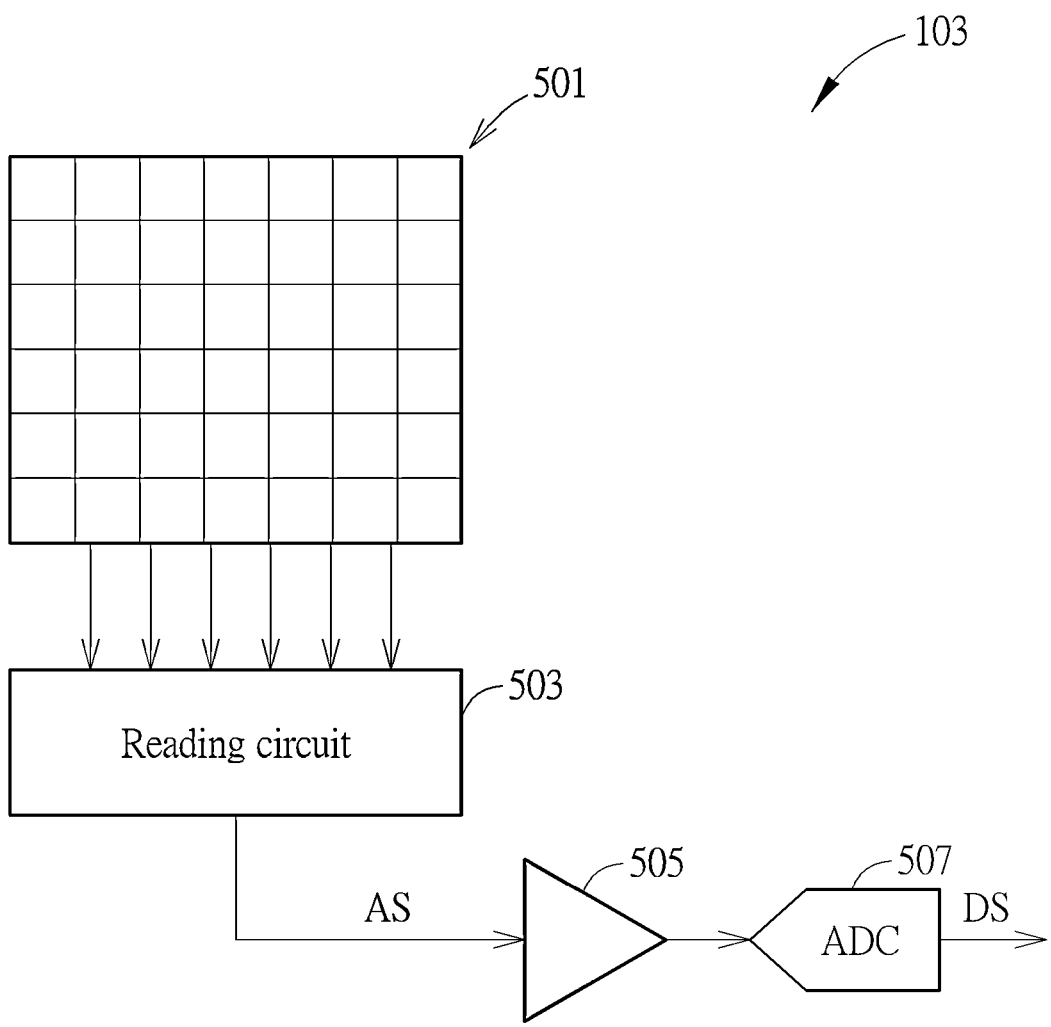
FIG. 5 is a schematic diagram illustrating different domains of the image signals, according to one embodiment of the present invention.

The above-mentioned embodiments can be performed in the analog domain or in the digital domain. FIG. 5 is a schematic diagram illustrating different domains of the image signals, according to one embodiment of the present invention. As shown in FIG. 5, the optical sensor 103 comprises a pixel array 501, a reading circuit 503, an amplifier 505 and an ADC (Analog to Digital Converter) 507. Pixel circuits in the pixel array 501 are configured to generate charges corresponding to received light. The reading circuit 503 is configured to read the charges to generate analog image signals AS. The amplifier 505, which can be removed in some embodiments is configured to generate amplified image signals. The ADC 507 is configured to convert the analog image signals AS to digital image signals DS. The above-mentioned embodiments can be performed based on the analog image signals AS or the digital image signals DS.

In one embodiment, the image sensing system provided by the present invention further comprises a light source, such as the light source LS illustrated in FIG. 1. Also, the image sensor 103 senses frames, which comprises reporting frames and non-reporting frames by a frame rate. In one embodiment, a luminous frequency of the light source and the frame rate are synchronized. Specifically, the light source emits light when the image sensor senses a frame and does not emit light when the image sensor does not sense a frame.

The embodiments provided by the present invention may be applied but not limited to a gaming mouse. Motion latency, which means the necessary time for acquiring images for motion computation, is one of the key aspects in evaluation of a gaming mouse. A good gaming mouse sensor needs to have low latency for motion reporting of actual physical motion. To solve such problem, the present application also provides the following embodiments.

Figure 6:
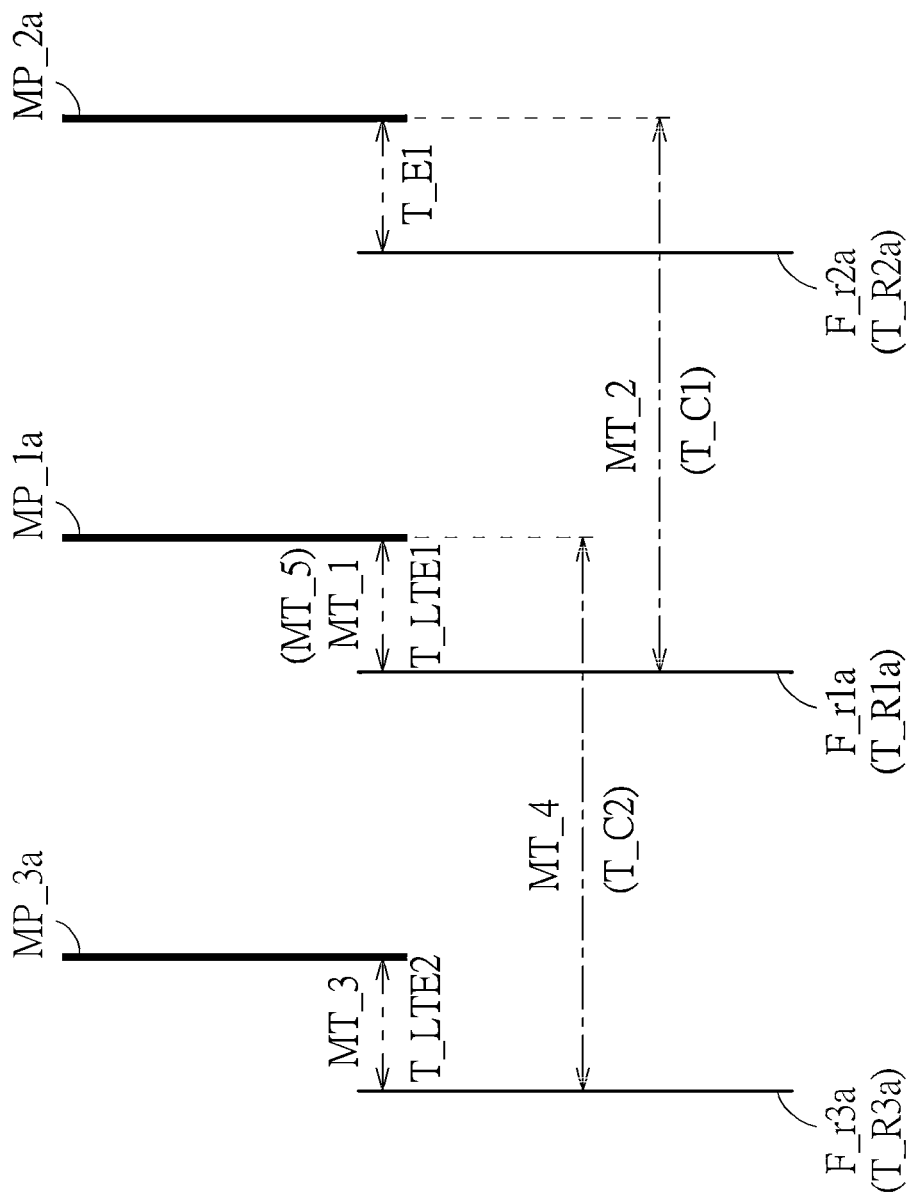
FIG. 6 is a schematic diagram illustrating an image sensing system control method according to another embodiment of the present invention.

FIG. 6 is a schematic diagram illustrating an image sensing system control method according to another embodiment of the present invention. As shown in FIG. 6, a first reporting frame F_r1a, a second reporting frame F_r2a and a third reporting frame F_r3a are defined. The first reporting frame F_r1a is sensed at a first reporting frame time T_R1a by the image sensor 103, the second reporting frame F_r2a is sensed at a second reporting frame time T_R2a by the image sensor 103, and the third reporting frame F_r3a is sensed at a third reporting frame time T_R3a by the image sensor 103. The first reporting frame F_r1a, the second reporting frame F_r2a and the third reporting frame F_r3a may be defined by the steps illustrated in the above-mentioned embodiments, but not limited.

Also, a first motion MT_1 of the image sensing system 100 for a first latency time interval T_LTE1 between a first polling time and the first reporting frame time T_R1a is computed, by the image sensor 103. The image sensor 103 receives a first poling MP_1a from the control circuit 101 at the first polling time. The first latency time interval T_LTE1 is the above-mentioned motion latency.

Besides, a second motion MT_2 of the image sensing system for a first calibration time interval T_C1 is computed by the image sensor 103. The first calibration time interval T_C1 comprises a first frame time interval between the first reporting frame time T_R1a and the second reporting frame time T_R2a, and comprises a first expected latency time interval T_E1 after the second reporting frame time T_R2a. In one embodiment, the first expected latency time interval T_E1 is a latency time interval between the first reporting frame time T_R1a and a second polling time. A second polling MP_2a is received at the second polling time. The first expected latency time interval T_E1 may be the above motion latency.

Next, the first motion MT_1 is subtracted from the second motion MT_2 to generate a first output motion by the image sensor 103. Afterwards, the image sensor 103 outputs the first output motion to the control circuit 101. In other words, the image sensor 103 reports the first output motion, which is equal to (MT-2-MT_1), to the control circuit 101 responding to the second polling MP_2a. A conventional image sensor only reports the motion between the first reporting frame F_r1a and the second reporting frame F_r2a, and does not concern the motions in the motion latency. Accordingly, the method disclosed in FIG. 6 may report more accurate motion.

Following the same rule, for the third reporting frame F_r3a, the image sensor 103 acquires a third motion MT_3 of the image sensing system 100 for a second latency time interval T_LTE2 between a third polling time and the third reporting frame time T_R3a. The image sensor 103 receives a third poling MP_3a from the control circuit 101 at the third polling time. Also, the image sensor 103 computes a fourth motion MT_4 of the image sensing system 100 for a second calibration time interval T_C2, wherein the second calibration time interval T_C2 comprises a second frame time interval between the third reporting frame time T_R3a and the first reporting frame time T_R1a, and comprises a second expected latency time interval after the first reporting frame time. In one embodiment, the second expected latency time interval is the above-mentioned first latency time interval T_LTE1. Then, the third motion MT_3 is subtracted from the fourth motion MT_4 to generate a second output motion by the image sensor. Since the third reporting frame F_r3a is previous to the first reporting frame F_r1a and the second reporting frame F_r2a, the first motion MT_1 may already be acquired before starting to compute the second motion MT_2. For example, a fifth motion MT_5 for the second expected latency time interval maybe computed as the first motion MT_1 before starting to compute the second motion MT_2.

The image sensing system control method in FIG. 6 may follow the Example 3 of the image sensing system control method illustrated in FIG. 2. That is, the first reporting frame F_r1a, the second reporting frame F_r2a and the third reporting frame F_r3a are respectively synchronized with different target time. In such case, the first reporting frame F_r1a, the second reporting frame F_r2a and the third reporting frame F_r3a in FIG. 6 may be respectively the second reporting frame F_r2, the third reporting frame F_r3 and the first reporting frame F_r1 in FIG. 2. Further, in such case, the first latency time interval T_LTE1, the first expected latency time interval T_E1 and the second latency time interval T_LTE2 are identical and fixed values, since the time interval between two adjacent pollings is fixed and the time interval between the target time and the polling is also fixed (e.g., the target reporting delay time interval T_MTI1 in FIG. 2). However, the first latency time interval T_LTE1, the first expected latency time interval T_E1 and the second latency time interval T_LTE2 may be acquired by acquired by other methods. For example, the first latency time interval T_LTE1, the first expected latency time interval T_E1 and the second latency time interval T_LTE2 may be predetermined values, or values anticipated in real time.

Figure 7:
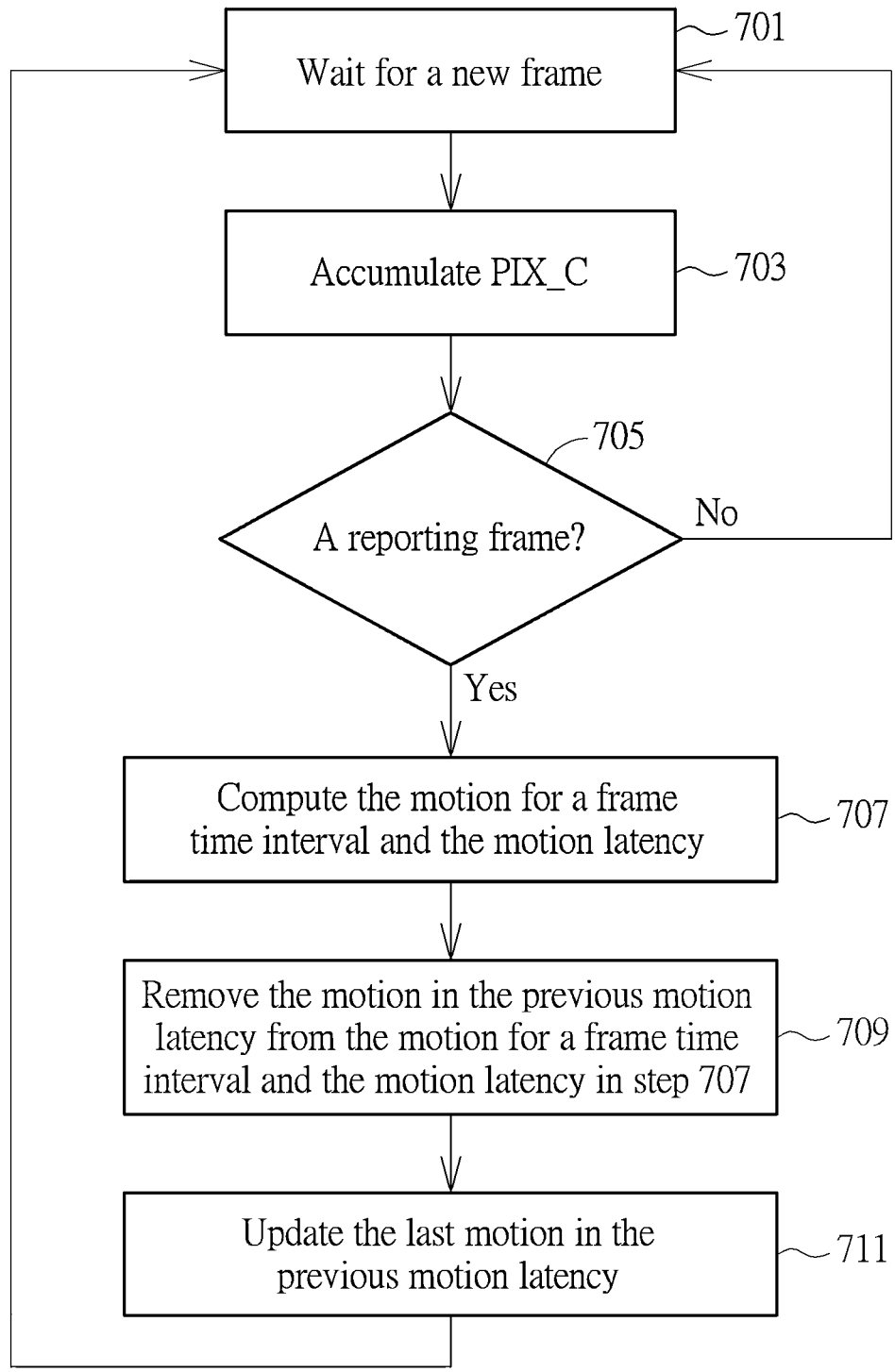
FIG. 7 is a flow chart illustrating detail steps of the image sensing system control method illustrated in FIG. 6, according to one embodiment of the present invention.

FIG. 7 is a flow chart illustrating detail steps of the image sensing system control method illustrated in FIG. 6, according to one embodiment of the present invention. It will be appreciated that the image sensing system control method provided by the present invention is not limited to the flow chart illustrated in FIG. 7. The image sensing system control method in FIG. 7 may be implemented by the image sensing system 100 shown in FIG. 1 and the image sensor 103 shown in FIG. 5, and comprises following steps:

Step 701

Wait for a new frame

Step 703

Accumulate PIX_C, which means accumulated motion in pixels.

Take the first reporting frame F_r1a FIG. 6 for example, motion in pixels for frames between the third reporting frame F_r3a and the first reporting frame F_r1a is accumulated. The step 703 may implement the examples illustrated in FIG. 3 and FIG. 4.

Step 705

Determine if the frame is a reporting frame or not, if yes, go to step 707, if not, go back to steps 701, 703 to continuous accumulating PIX_C.

Step 707

Compute the motion for a frame time interval and the motion latency, such as the second motion MT_2 in FIG. 6.

For more detail, in one embodiment, the second motion MT_2 may be acquired by the following Equation (1).

$$DPI\_C = \frac{(MRP1 + T\_LTE1)}{MRP1} \times DPI \text{ and } MT\_PI \times DPI\_C = MT\_2$$

MRP1 is the first frame time interval between the first reporting frame time T_R1a and the second reporting frame time T_R2a. Please note, in one embodiment, the MRP1 is a known parameter since the reporting frames are already adjusted to the target time, as shown in the embodiment of FIG. 2. T_LTE1 is the first latency time interval illustrated in FIG. 6, DPI is a predetermined DPI (dot per inch) value. In one embodiment, the DPI has a value for the first frame time interval. MT_PI is motion per inch for the image sensing system and MT_2 is the second motion in FIG. 6.

MT_PI may be acquired by a following Equation (2):

$$\frac{PIX\_C}{PIX\_N}$$

PIX_C is the accumulated motion in pixels in the step 701 and PIX_N is number of the pixels per inch.

Please note, the step 707 may be used to compute other motion of the calibration time interval rather than limited to the second motion MT_2.

Step 709

Remove the motion in the previous motion latency from the motion for a frame time interval and the motion latency in step 707. For example, in the embodiment of FIG. 6, the first motion MT_1 is removed from the second motion MT_2.

In one embodiment, the first motion MT_1 is computed by the following Equation (3):

$$DPI\_L = \frac{T\_LTE1}{MRP1} \times DPI \text{ and } MT\_PI \times DPI\_L = MT\_1$$

wherein MRP1 is the first frame time interval in the step 707 and T_LTE1 is the first latency time interval illustrated in FIG. 6, DPI is a predetermined DPI value, MT_PI is motion per inch for the image sensing system The step 709 may be applied to other motion in the previous motion latency rather than limited to the first motion MT_1.

For example, the fifth motion MT_5 is computed according to following equations:

$$DPI\_L = \frac{T\_LTE2}{MRP2} \times DPI \text{ and } MT\_PI \times DPI\_L = MT\_5$$

MRP2 is the second frame time interval in FIG. 2 and FIG. 6, and T_LTE2 is the second expected latency time interval, DPI is a predetermined DPI value, MT_PI is motion per inch for the image sensing system and MT_5 is the fifth motion.

Step 711

Update the last motion in the previous motion latency. For example, in FIG. 6, the fifth motion MT_5 is computed while computing the fourth motion MT_4, and the fifth motion MT_5 is updated as the motion in the previous motion latency while computing the second motion MT_2.

Figure 8:
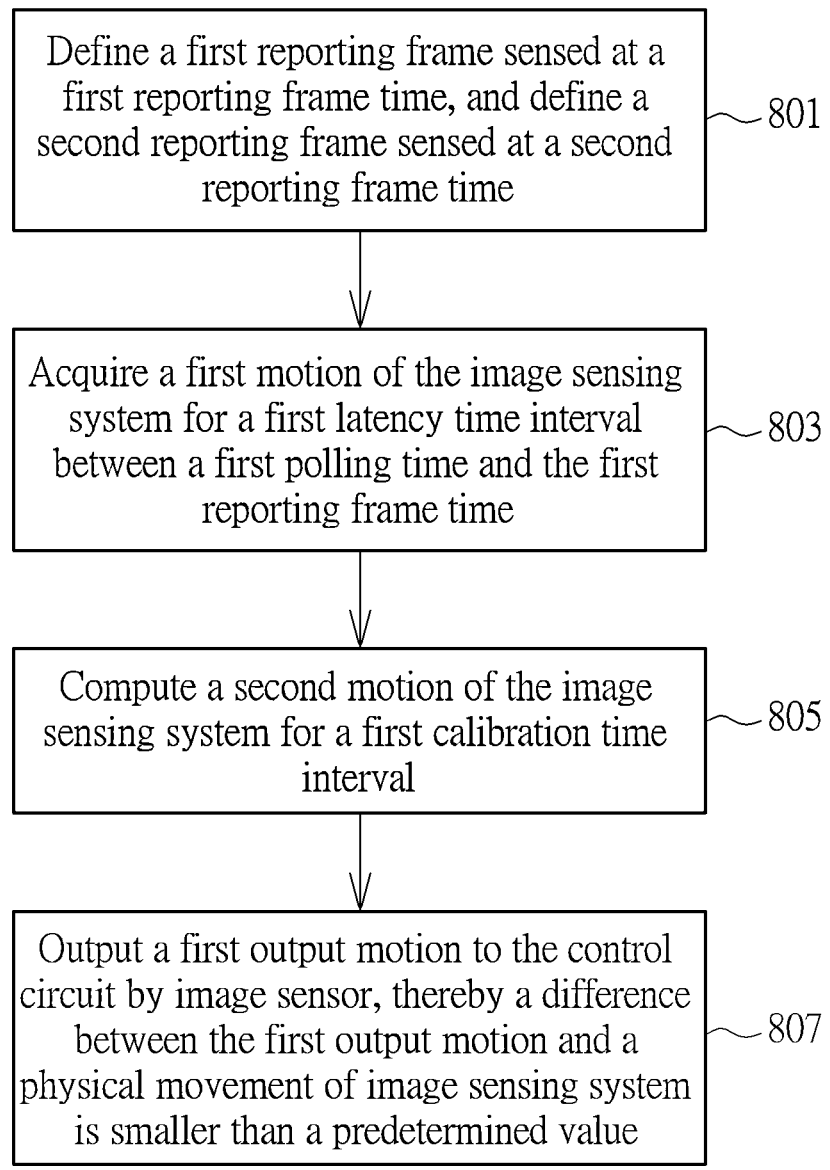
FIG. 8 is a flow chart illustrating summarized steps of the embodiments illustrated in FIG. 6 and FIG. 7, according to one embodiment of the present invention.

In view of above-mentioned embodiments, summarized steps of an image sensing system control method can be acquired, which is applied to an image sensing system comprising an image sensor and a control circuit. FIG. 8 is a flow chart illustrating summarized steps of the embodiments illustrated in FIG. 6 and FIG. 7, according to one embodiment of the present invention. FIG. 8 comprises following steps:

Step 801

Define a first reporting frame (e.g., F_r1a in FIG. 6) sensed at a first reporting frame time by the image sensor, and define a second reporting frame (e.g., F_r2a in FIG. 6) sensed at a second reporting frame time after the first reporting frame time.

The first reporting frame and the second reporting frame may be defined following the method stated in the descriptions of FIG. 2, but not limited.

Step 803

Acquire a first motion (e.g., MT_1 in FIG. 6) of the image sensing system for a first latency time interval (e.g., T_LTE1 in FIG. 6) between a first polling time and the first reporting frame time (e.g., T_R1a in FIG. 6), by the image sensor, wherein the image sensor receives a first poling (e.g., MP_1a in FIG. 6) from the control circuit at the first polling time.

Step 805

Compute a second motion (e.g., MT_2 in FIG. 6) of the image sensing system for a first calibration time interval (e.g., T_C1 in FIG. 6) by the image sensor, wherein the first calibration time interval comprises a first frame time interval between the first reporting frame time and the second reporting frame time (e.g., T_R2a in FIG. 6), and comprises a first expected latency time interval (e.g., T_E1 in FIG. 6) after the second reporting frame time.

If the image sensing system control method illustrated in FIG. 8 follows the embodiment of FIG. 2, the first latency time interval and the first expected latency time interval may be identical fixed values, since the first reporting frame time and the second reporting frame time are adjusted to predetermined time. However, the first latency time interval and the first expected latency time interval may be acquired or set by other methods.

Step 807

Output a first output motion to the control circuit by image sensor, thereby a difference between the first output motion and a physical movement of image sensing system is smaller than a predetermined value.

In other words, in the step 807 the first output motions output by the steps in FIG. 8 are close to physical movements of the image sensing system. If the image sensing system is applied to an optical mouse, the first output motions are close to a physical trajectory of the optical mouse. As above-mentioned, in one embodiment, the first output motion is generated by subtracting the first motion from the second motion.

Other steps can be acquired in view of above-mentioned embodiments, thus details thereof are omitted for brevity here.

In view of above-mentioned embodiments, the motion of the motion latency may be compensated, thus the motion reporting of the image sensor can be more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensing system control method, applied to an image sensing system comprising an image sensor and a control circuit, comprising:
   (a) defining a first reporting frame sensed at a first reporting frame time by the image sensor, and defining a second reporting frame sensed at a second reporting frame time after the first reporting frame time by the image sensor;
   (b) acquiring a first motion of the image sensing system for a first latency time interval between a first polling time and the first reporting frame time, by the image sensor, wherein the image sensor receives a first polling from the control circuit at the first polling time;
   (c) computing a second motion of the image sensing system for a first calibration time interval by the image sensor, wherein the first calibration time interval comprises a first frame time interval between the first reporting frame time and the second reporting frame time, and comprises a first expected latency time interval after the second reporting frame time;
   (d) outputting a first output motion to the control circuit by the image sensor, thereby a difference between the first output motion and a physical movement of the image sensing system is smaller than a predetermined value.

2. The image sensing system control method of claim 1, wherein the step (d) outputs the first output motion corresponding to a second polling, wherein the second polling is generated by the control circuit, and received by the image sensor at a second polling time, wherein a time difference between the second polling time and the second reporting frame time is the first expected latency time interval.

3. The image sensing system control method of claim 1, wherein the second motion is computed according to following equations:

$$DPI\_C = \frac{(MRP1 + T\_LTE1)}{MRP1} \times DPI \text{ and } MT\_PI \times DPI\_C = MT\_2$$

wherein MRP1 is the first frame time interval and T_LTE1 is the first expected latency time interval, DPI is a predetermined DPI (dot per inch) value, MT_PI is motion per inch for the image sensing system and MT_2 is the second motion.

4. The image sensing system control method of claim 3, wherein MT_PI is acquired by a following equation:

$$\frac{PIX\_C}{PIX\_N}$$

wherein PIX_C is accumulated motion in pixels and PIX_N is number of the pixels per inch.

5. The image sensing system control method of claim 1, further comprising following steps before the step (a):
   defining a third reporting frame sensed at a third reporting frame time before the first reporting frame time, by the image sensor;
   acquiring a third motion of the image sensing system for a second latency time interval between a third polling time and the third reporting frame time, by the image sensor, wherein the image sensor receives a third polling from the control circuit at the third polling time;
   computing a fourth motion of the image sensing system for a second calibration time interval by the image sensor, wherein the second calibration time interval comprises a second frame time interval between the third reporting frame time and the first reporting frame time, and comprises a second expected latency time interval after the first reporting frame time;
   subtracting the third motion from the fourth motion to generate a second output motion by the image sensor; and
   computing a fifth motion for the second expected latency time interval as the first motion.

6. The image sensing system control method of claim 5, wherein the fifth motion is computed according to following equations:

$$DPI\_L = \frac{T\_LTE2}{MRP2} \times DPI \text{ and } MT\_PI \times DPI\_L = MT\_5$$

wherein MRP2 is the second frame time interval and T_LTE2 is the second expected latency time interval, DPI is a predetermined DPI value, MT_PI is motion per inch for the image sensing system and MT_5 is the fifth motion.

7. The image sensing system control method of claim 6, wherein MT_PI is acquired by following equation:

$$\frac{PIX\_C}{PIX\_N}$$

wherein PIX_C is accumulated motion in pixels and PIX_N is number of the pixels per inch.

8. The image sensing system control method of claim 1, wherein the image sensing system comprises a light source, and the image sensor senses frames by a frame rate, wherein a luminous frequency of the light source and the frame rate are synchronized.

9. The image sensing system control method of claim 1, wherein the image sensing system is an optical mouse.

10. An image sensing system, comprising:
a control circuit; and
an image sensor, configured to perform:
(a) defining a first reporting frame sensed at a first reporting frame time, and defining a second reporting frame sensed at a second reporting frame time after the first reporting frame time;
(b) acquiring a first motion of the image sensing system for a first latency time interval between a first polling time and the first reporting frame time, wherein the image sensor receives a first polling from the control circuit at the first polling time;
(c) computing a second motion of the image sensing system for a first calibration time interval, wherein the first calibration time interval comprises a first frame time interval between the first reporting frame time and the second reporting frame time, and comprises a first expected latency time interval after the second reporting frame time; and
(d) outputting a first output motion to the control circuit, thereby a difference between the first output motion and a physical movement of the image sensing system is smaller than a predetermined value.

11. The image sensing system of claim 10, wherein the step (d) outputs the first output motion corresponding to a second polling, wherein the second polling is generated by the control circuit, and received by the image sensor at a second polling time, wherein a time difference between the second polling time and the second reporting frame time is the first expected latency time interval.

12. The image sensing system of claim 10, wherein the second motion is computed according to following equations:

$$DPI\_C = \frac{(MRP1 + T\_LTE1)}{MRP1} \times DPI \text{ and } MT\_PI \times DPI\_C = MT\_2$$

wherein MRP1 is the first frame time interval and T_LTE1 is the first expected latency time interval, DPI is a predetermined DPI (dot per inch) value, MT_PI is motion per inch for the image sensing system and MT_2 is the second motion.

13. The image sensing system of claim 12, wherein MT_PI is acquired by a following equation:

$$\frac{PIX\_C}{PIX\_N}$$

wherein PIX_C is accumulated motion in pixels and PIX_N is number of the pixels per inch.

14. The image sensing system of claim 10, wherein the image sensor further performs following steps before the step (a):
defining a third reporting frame sensed at a third reporting frame time before the first reporting frame time;
acquiring a third motion of the image sensing system for a second latency time interval between a third polling time and the third reporting frame time, wherein the image sensor receives a third polling from the control circuit at the third polling time;
computing a fourth motion of the image sensing system for a second calibration time interval, wherein the second calibration time interval comprises a second frame time interval between the third reporting frame time and the first reporting frame time, and comprises a second expected latency time interval after the first reporting frame time;
subtracting the third motion from the fourth motion to generate a second output motion; and
computing a fifth motion for the second expected latency time interval as the first motion.

15. The image sensing system of claim 14, wherein the fifth motion is computed according to following equations:

$$DPI\_L = \frac{T\_LTE2}{MRP2} \times DPI \text{ and } MT\_PI \times DPI\_L = MT\_5$$

wherein MRP2 is the second frame time interval and T_LTE2 is the second expected latency time interval, DPI is a predetermined DPI value, MT_PI is motion per inch for the image sensing system and MT_5 is the fifth motion.

16. The image sensing system of claim 15, wherein MT_PI is acquired by following equation:

$$\frac{PIX\_C}{PIX\_N}$$

wherein PIX_C is accumulated motion in pixels and PIX_N is number of the pixels per inch.

17. The image sensing system of claim 10, further comprising a light source, wherein the image sensor senses frames by a frame rate, wherein a luminous frequency of the light source and the frame rate are synchronized.

18. The image sensing system of claim 10, wherein the image sensing system is an optical mouse.

* * * * *